Nov. 2, 1937.  J. D. ROBERSON  2,097,936
DEVICE FOR SIFTING AND FLUFFING FLOUR
Original Filed Dec. 10, 1934  2 Sheets—Sheet 1
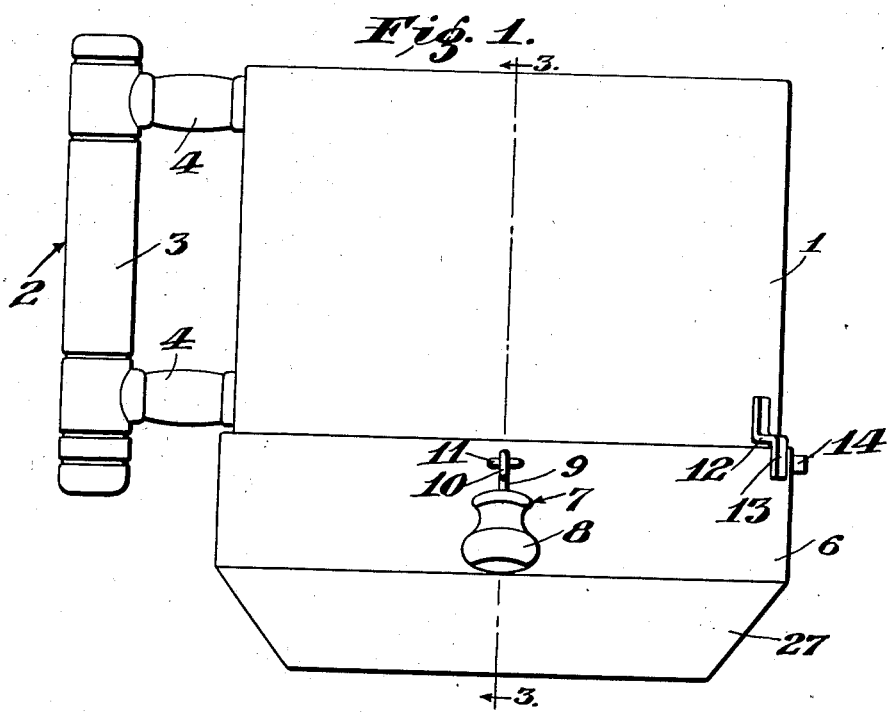
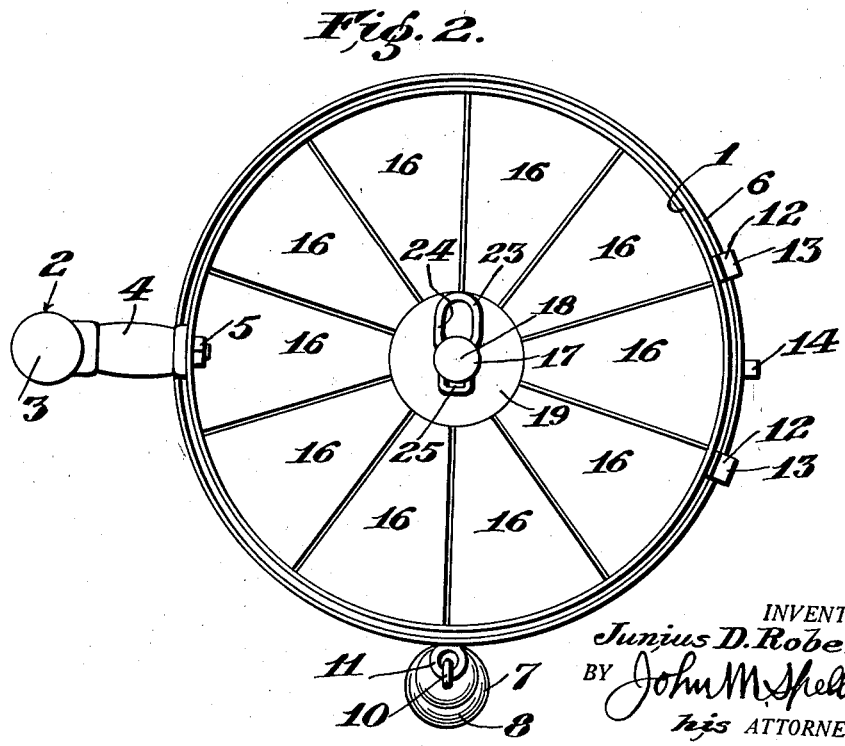
INVENTOR:
Junius D. Roberson,
BY John M. Shellman
his ATTORNEY.

Nov. 2, 1937.   J. D. ROBERSON   2,097,936
DEVICE FOR SIFTING AND FLUFFING FLOUR
Original Filed Dec. 10, 1934   2 Sheets-Sheet 2
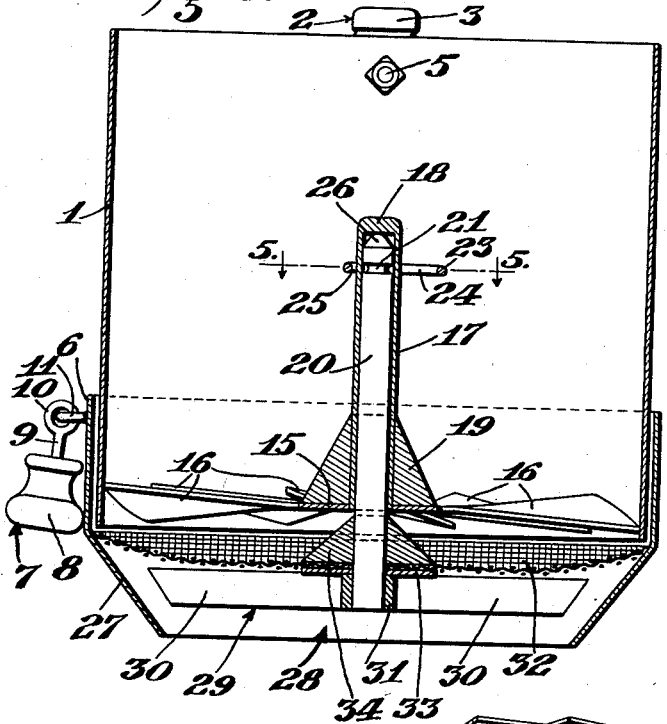
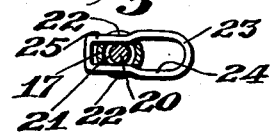
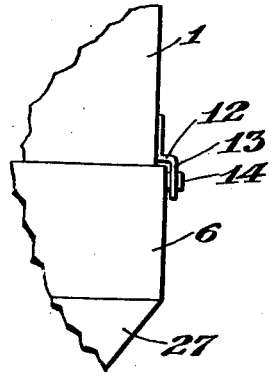
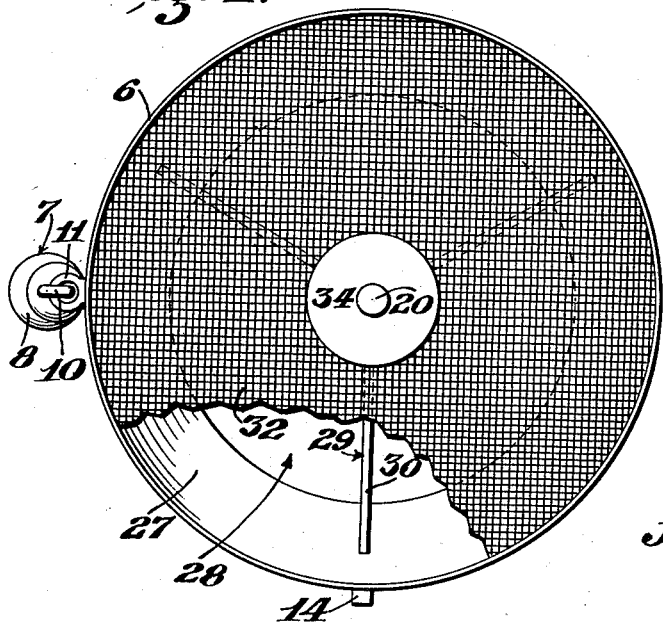
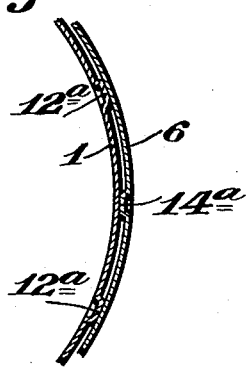
INVENTOR:
Junius D. Roberson,
BY John M. Spellman
his ATTORNEY.

Patented Nov. 2, 1937

2,097,936

UNITED STATES PATENT OFFICE 2,097,936

DEVICE FOR SIFTING AND FLUFFING FLOUR

Junius D. Roberson, Cleburne, Tex.

Substituted for abandoned application Serial No. 756,865, December 10, 1934. This application May 3, 1937, Serial No. 140,458

10 Claims. (Cl. 209—245)

This invention relates to a flour sifter and it may be more properly termed a "flour fluffer" because the object of the invention is not to merely run flour through a sifter in the ordinary way but to effectively loosen the minute particles and aerate the flour as will be later more fully described.

This is a substitute for my abandoned application number 756,865, filed Dec. 10, 1934.

A characteristic of wheat flour is its tendency to pack under its own weight so as to resist absorption of water, milk and other liquids, shortening and other ingredients used in cooking. As is well known, flour when being prepared for baking bread and cake, pastry, et cetera, is greatly improved for results if it is first thoroughly loosened, separated and fluffed, and it is difficult and even quite impossible with some of the old style utensils employed to accomplish this. In any event, it is the common practice to resift the flour several times through the ordinary sifter. There are other disadvantages in the use of the ordinary sifter, one of which in particular, is the inability of the user to keep the sifted flour easily within the limited area of the mixing bowl, other receptacle or particular place on a working board or table top, due to there being no special provision for confining the sifted flour at the outlet of the sifter.

The present invention has for its principal object to produce a simple, practical and efficient sifting device, requiring only a single sifting screen, and constructed and arranged interiorly with a peculiar support for the body of flour as initially placed in the device which withholds the packed body of flour thereon with provision for letting only a limited quantity of the flour to fall at a time upon an oscillatory sifting screen therebeneath, whereby no excess accumulation can occur upon the screen to retard the passage of the flour through its meshes and thereby obviating the necessity for providing an agitator or scraper in cooperative relation to the screen as most invariably provided in the ordinary sifters, unless the agitation of the flour is affected by the hand of the user.

Another object of the invention is to provide a peculiarly formed and restricted outlet for the sifted flour and cooperating with the sifting elements to prevent excess spreading of the discharged flour, and at the same time piling the flour in an ideal manner for the working thereof in the product to be prepared for cooking or other use or treatment.

Further objects and advantages to be attained will hereinafter more fully appear in the following specification.

The invention consists in the novel general construction and arrangement of the device and in the particular parts and combinations and arrangements in themselves as hereinafter described and afterwards set forth in the appended claims.

In the accompanying drawings illustrative of a practical adaptation of the invention:

Fig. 1 is a side elevation of the device.

Fig. 2 is a top plan view.

Fig. 3 is a vertical section on the line 3—3, of Fig. 1.

Fig. 4 is a top plan view of the oscillatory sifting element of the device detached from the upper body element, a portion of the sifting screen being broken away to show details of the supporting spider-frame and the annular, contracted, flange surrounding the restricted outlet for the sifted flour.

Fig. 5 is a section on the line 5—5, of Fig. 3.

Fig. 6 is a fragmentary view, in the side elevation, to show details of the cooperative bumpers or stop elements which limit the relative rotative movement of the upper body element and lower sifting element of the device.

Fig. 7 is an edge view of the flour supporting bottom portion of the upper body element of the device.

Fig. 8 is a fragmentary section through adjacent portions of the upper body element and lower sifting element of the device, illustrating a modification of the bumper or stop element.

Referring now to the drawings, the numeral 1 designates the upper cylindrical body shell having a handle 2 which may be of any approved or desired type, but, preferably, comprising a grasping portion 3 and lateral supporting arms 4 which may be obviously secured detachably to the body shell 1 by a bolt and nut 5, as shown.

Oscillatorily rotatable about the lower portion of the body shell 1, in a manner to be later more fully described, is a detachable sifter element 6, having preferably, and for more effective and practical operation of the device, a loosely and universally hinged or swivelled, handle 7, which as shown, comprises a knob member 8 having a stem 9 with an eye 10 loosely engaged in a supporting eye 11 which is obviously welded, soldered or otherwise secured in any approved manner to the upper marginal portion of the sifter element 6.

Relative rotative movement of the upper body shell 1 and the lower sifter element 6 is limited by providing a spaced pair of lugs 12 on the outer face of the shell 1 adjacent to the sifter element 6 and having said lugs offset outwardly and extended downwardly as at 13, over the upper marginal portion of said element 6 and providing on the element 6 a stud 14, as shown in Figs. 1, 2, 4, and 6, said lugs 12 and stud 14 being welded, soldered or otherwise secured in place. However, other provisions may be made for the purpose, as for example, by embossing protuberances 12a on the body shell 1, outwardly, and likewise producing a protuberance 14a inwardly on the element 6, as shown in Fig. 8. This latter provision is practical in some cases, because, the peculiar construction and arrangement of the means for mounting the lower sifting element 6 on the upper body shell 1, as hereinafter described, permits of considerable clearance between the telescoped portions of the two elements 1 and 6.

Obviously, the distance between the pair of lugs 12 or protuberances 12a may be varied in different cases, but in any case, they are spaced sufficiently to permit considerable rotative movement between the two elements 1 and 6 to attain some momentum and enable them to strike forcibly against the interposed stud 14 or protuberance 14a and thereby cause a shock that will dislodge the flour on the sifting element 6, as will be presently more clearly set forth.

Secured marginally within the body shell 1, near the lower end thereof, by welding, soldering or other approved means, is a supporting bottom 15 for initially supporting the flour that is placed in the device. This bottom member 15 may be obviously blanked and formed from sheet metal or produced by die-casting or other approved methods, and as shown, comprises a central, flat, disk-like hub portion (see Fig. 3) from which radiate segmental portions or fan-like blades 16 whose radial margins meet in close relation, though cut apart, making, in effect, when viewed in top plan, as shown in Fig. 2, a complete circular disk. However, the portions 16 are each given a twisted set, in a manner somewhat similar to the blades of a rotary fan. By this form of flour supporting bottom, the flour placed in the body shell 1, due to its characteristic, natural packing quality, piles up on the bottom blades 16 without flowing appreciably through the openings between said blades, except when agitated by hand or some mechanical means, or as in the device of the present invention, by the shock or impact when the lug 12 or protuberance 12a strikes the stud 14 or protuberance 14a as just above described.

Extending axially upward from the hub portion 15 of the supporting bottom is a tubular stem member 17, open at its lower end, but closed, as at 18, at its upper end. Surrounding the base portion of this tubular stem member 17, and secured integrally, in any approved manner, to said stem member and the hub portion 15 of the flour-supporting bottom, is a conical member 19, which not only gives rigidity and stability to the structure, but serves to prevent undue choking of the openings between the respective segmental portions of blades 16 in the immediate region of said member 19, at which place the openings are obviously of much lesser area than near the peripheral portions of the said portions 16.

Extending upwardly from the sifting element 6 is an elongated stud-shaft or supporting spindle 20, which is received in the tubular stem member 17 with a rotative fit, and is releasably held in place by having an annular groove 21 near its upper end which registers with opposed transverse slots 22 in said tubular stem member 17 (see Fig. 5), said groove 21 and slots 22 having a slidable bail or looped retaining member 23 in cooperative relation therewith. Said member 23 may obviously be formed of a piece of wire with its meeting ends welded or soldered together, or it may be stamped out of sheet metal or formed by any other approved method, such as die-casting or the like. As shown, the member 23 is permanently supported slidably in the slots 22 of the stem member 17, its widened portion 24 as well as its narrower portion 25 being supported in said slotted portions 22 when it is moved longitudinally in either direction, and the mounting is such that said member 23 is guided in its movement and prevented from turning about the axis of said stem member 17.

The widened portion 24 of the retaining member 23 corresponds to the overall diameter of the stud-shaft or spindle 20, so that said element 20 is movable endwise freely therethrough, but the narrower portion 25 of said member 23 in width corresponds to the diameter of the restricted neck-portion of said stud-shaft or spindle where the annular groove 21 occurs. Thus, when said narrower portion 25 of the member 23 is moved into engaging relation to the grooved portion 21 of said element 20, the element 20 is held in place within said tubular stem member 17, yet when said retaining member 23 is moved in the opposite direction to bring the widened portion 24 in position said stud-shaft or spindle 20 is readily removed from the tubular stem 17.

Preferably, the upper end portion of the stud shaft or spindle 20 is tapered or rounded to afford an apex bearing against the end closure 18 of said tubular stem member 17, as at 26. This produces an anti-friction end bearing making the relative rotation of the parts 17 and 20 easier. Obviously, in some cases, if desired, ball or other suitable anti-friction bearings may be provided between said parts 17 and 20, but as the same per se constitutes no part of the present invention it is deemed unnecessary to illustrate it in the drawings.

The lower portion of the sifting element 6, as shown, is tapered, as at 27, to produce a restricted outlet opening 28 for the sifted flour, and said portion 27, by the forward convergence of the annular wall as shown, causes the flour to move more towards the center of the pile as it is discharged into a receptacle or upon a supporting board or table top, instead of spreading as occurs where the delivery end of a sifter is plain cylindrical in form. Within this tapered portion 27, a spider-frame 29 is secured at the ends of its legs 30 (see Figs. 3 and 4), said spider-frame having the lower end portion of the stud-shaft or spindle member 20 securely fastened in its hub portion 31.

Above the spider-frame 29 is a sifting screen 32 which is supported at its central portion on a disk 33 resting directly upon and secured, by welding, soldering or other approved means, to said spider-frame 29. Immediately above the central portion of the sifting screen 32 and surrounding the base portion of the stud-shaft or spindle 20, is a conical member 34, which is secured integrally to the member 20 and to the adjacent underlying portion of the sifting screen 32, thereby making a rigid and stable structure which is supported by the stud-shaft or spindle member 20 when the latter is rotatably secured in the stem member 17 of the upper body shell 1, as shown more clearly in Fig. 3 of the drawings.

Preferably the sifting screen 32 is dished, as shown more clearly in Fig. 3, by which form the preponderance of the flour deposited near the periphery of the screen is distributed towards the center of the screen during the sifting operation of the device.

In operation, flour is placed in the upper body shell 1, where it packs by its own weight upon the supporting bottom blades 16. The device is held by the handle 2 in one hand of the operator who grasps with the other hand the knob 8 of the loosely hinged handle 7 and by a quick movement oscillates the lower sifter element 6 about the axis of the stud-shaft or spindle 20 in the tubular stem member 17 of the upper body shell 1, striking the lugs 12 or protuberances 12a forcibly against the interposed stud 14 or protuberance 14a, as the case may be, according to the modification illustrated in Figs. 6 and 8. The suspended support afforded the upper body shell 1 in the hand of the operator obviously gives some appreciable swinging motion to the shell 1 and the impact of the lugs 12 or protuberances 12a against the stud 14 or protuberance 14a jars some of the flour from the supporting bottom blades 16, but not in sufficient quantity to pack in an excessive pile upon the sifting screen 32. At the same time the shock causes the flour deposited on the screen 32 to sift readily therethrough, whereupon the loosely separated particles of the flour are discharged in an aerated and fluffy condition through the outlet opening 28 and into a receptacle or upon a working board or table, as the case may be, and as hereinbefore described.

The effect of the convergent lower annular wall 27 of the sifting element 6 is to deposit the sifted flour in a restricted conical pile with a crater-like depression at its middle instead of a substantially true conical formation, which is of good advantage in the preparation of the flour preliminary to the addition of the liquid, shortening and other ingredients, and this, with the elimination of clogging the sifting screen 32 by depositing thereon only a minimum quantity of flour to be sifted during the sifting operation, makes for the extremely high efficiency and practicability of the device. It may be here noted, also, that the loosely hinged or swivelled mounting of the operating handle 7 is of particular advantage in that the oscillatory movement of the sifting element 6 is greatly facilitated, because the operator does not have to follow with his hand the circular path concentric with the wall of the sifting element 6, but by the peculiar attachment of the handle 7, the operator's hand travels in a directly straight line back and forth during the reciprocation of the element 6.

Obviously, the device admits of considerable modification within the spirit and scope of the invention as defined by the appended claims. The invention therefore, is not limited to the specific construction and arrangement of the device as illustrated in the accompanying drawings.

By the provision of a sifting and fluffing device in accordance with the present invention, not only is the necessity for many re-siftings of the flour eliminated in getting the desired condition of the flour for all purposes, but the elimination of the agitating and scraping element in the container shell and sifting element makes it possible to remove weevils, worms, owing to the shaking and shocking actions of the container and sifting elements rather than by a pushing, mashing, squeezing or forcing effect. This is of material advantage in the salvaging of the flour containing the above noted foreign matter, because after removal of such matter the flour is otherwise good for use as if it never contained said matter, and, furthermore, the prevention of accumulation and packing of the flour on the sifting screen facilitates the quick sifting and separation of the particles of the flour with an appreciable aerating effect which makes it light and fluffy and readily absorbent for the liquids and other ingredients used in preparation for baking and other purposes.

By maintaining two distinct flour-working levels in the device, as herein set forth, that is to say, by having an initial flour-supporting bottom from which only a limited quantity of the flour is delivered to the sifting screen beneath, and the provision for quickly sifting the deposited flour from the screen by an impacting action between the initial flour container and the sifting element, the container and sifting element may be assembled telescopically in working relation, and, as hereinbefore stated, with considerable space between their telescoped wall portions, there is no chance for wastage of the flour by working upwardly between said wall portions. On the contrary, the outside air is drawn downwardly through said space between the wall portions, due to the natural draft created by the downward movement of the sifted flour, thereby preventing dusting loss of the flour upwardly through said space and at the same time greatly facilitating the sifting and aeration of the flour.

What I claim, is:

1. A two element flour sifting and fluffing device, one element comprising a swingably suspended upper flour receiving container having a generally solid flour-supporting bottom provided with restricted openings whereby to normally support the contained flour in a naturally self-packed quantity, the other element comprising a lower sifter container movably supported on said upper container and having a sifting screen in receiving relation beneath the restricted openings of the flour-supporting bottom of said upper container, stop means for limiting relative reciprocal movement between said upper and lower containers, and means for forcibly reciprocating said lower container on its support on said upper container, with impact of said stop means at the end of each stroke in either direction, whereby flour is dislodged from the flour supporting bottom of said upper container and delivered in limited quantity into said lower container and by the same impacting effect the deposited flour is sifted through the sifting screen of said lower container without accumulation on the screen.

2. The device as set forth in claim 1, wherein the swinging suspension of the upper flour receiving container comprises a handle element on said upper container for manually supporting the container, and the means for reciprocating said lower container comprises a manually manipulable handle element universally hingedly attached to the container wall laterally thereof.

3. A flour sifting and fluffing device of the character described comprising a substantially cylindrical container shell having a bottom radially slotted and formed in substantially circular fan shape with segmental blade portions, in twisted set, to provide a support for the self-packed quantity of flour in the container, the radial margins of each blade member coinciding substantially in the same vertical planes with the corresponding margins of the next adjoining blade member but the openings between the segmental blade members widening from center of the container bottom towards the periphery thereof, and a sifting element rotatably supported axially on said container, said sifting element having a sifting screen in receiving relation beneath said segmental bladed bottom of the container, means for oscillating said sifting element on its support on said container, and means for limiting rotative movement between said container and said sifting element in either direction and causing shock to said parts by impact upon forcible oscillation of said sifting element.

4. The device set forth in claim 3, wherein the means for limiting rotation of the parts, comprises spaced stop members on the container and an interposed stop member on the sifting element, and further including a supporting handle for the container and an operating handle universally hingedly attached to the sifting element.

5. The herein described device for sifting and fluffing flour, comprising a substantially cylindrical container shell, a supporting handle on the shell, a flour-supporting bottom in the shell comprising a circular fan-like member secured rigidly at its periphery to the shell and having radial slots to provide segmental blade portions with twisted set and the radial side margins of each blade coinciding in the same vertical plane with the corresponding margins of the next adjoining blade members whereby to produce radial openings between the blades widening vertically from center of the bottom towards the periphery thereof, a tubular stem extending axially from the flour-supporting bottom, a sifting element having a sifting screen in receiving relation beneath said flour-supporting bottom of the container shell, an axial spindle member extending axially from said sifting element, said spindle member being rotatably fitted in said tubular stem member, and an operating handle on said sifting element, said container shell and said sifting element having stop members for limiting relative rotative movement between them.

6. The device set forth in claim 5, wherein the sifting screen of the sifting element is dished, and the operating handle of the element is universally hingedly attached thereto.

7. The device set forth in claim 5, and further comprising conical axially disposed flour-deflecting base members, one of which is secured on the upper side of the flour-supporting bottom of the container shell, and the other being secured on the upper side of the sifting screen of the sifting element.

8. A flour sifting and fluffing device of the character described comprising a cylindrical container shell having a flour-supporting bottom with restricted openings for normally holding an entire body of flour at an upper working level, and a cylindrical sifting element rotatably supported on said container shell and having a sifting screen in receiving relation beneath said flour-supporting bottom of said container shell, the lower portion of the container shell located telescopically within the upper portion of said sifting element with an annular air inlet space between said telescoped portions, said sifting element having a tapered lower portion to produce a restricted outlet opening and the tapered wall portion to deflect the peripheral portion of the stream of discharged sifted flour towards the center of the stream, whereby the flour is aerated and increased in bulk during the transfer from the container shell to the sifting element and during the sifting operation and the sifted flour is delivered from the restricted outlet opening of the sifting element and deposited in a substantially aerated conical pile in and/or on a receptacle or receiving surface.

9. The device as set forth in claim 8, and further comprising means for horizontally swingably supporting said container shell, means for limiting relative rotative movement between the container shell and the sifting element, and means for forcibly rotating oscillatorily said sifting element on said container shell with impacting stop at the end of each stroke in either direction.

10. A two-element flour sifting, aerating and fluffing device, as described, comprising an upper element and a lower element, means for supporting the upper element in operating position whereby to be susceptible to shock, the lower element oscillatorily mounted axially and rotatably with respect to the upper element, means for normally holding the flour to be treated at an upper working level in said upper element, the support for the flour comprising a bottom member substantially continuously supportingly flat throughout but having restricted sheltered vertical openings through which a limited quantity of flour is dislodged substantially horizontally and delivered from said upper element by shock, said lower element having a sifting screen receiving the flour delivered from said upper element, means for admitting externally free air between the flour supporting bottom member of said upper element and the sifting screen of said lower element, and annularly about and intermingledly into the flour as it passes from said supporting bottom to said sifting screen, means for forcibly oscillating said lower element with respect to said upper element, and limiting stops on each of said elements whereby at the end of each stroke of said oscillated lower element, in either direction, impact occurs and the resultant shock dislodges the said limited quantity of flour in said upper element and simultaneously effects the shifting of the dislodged flour through the sifting screen of said element without accumulation of material on the screen.

JUNIUS D. ROBERSON.